US008875609B2

(12) United States Patent (10) Patent No.: US 8,875,609 B2
Stellmann (45) Date of Patent: Nov. 4, 2014

(54) POWER TOOL

(75) Inventor: Georg Stellmann, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 584 days.

(21) Appl. No.: 12/633,397

(22) Filed: Dec. 8, 2009

(65) Prior Publication Data

US 2010/0147125 A1 Jun. 17, 2010

(30) Foreign Application Priority Data

Dec. 16, 2008 (DE) .................. 10 2008 054 696

(51) Int. Cl.
*B23D 45/06* (2006.01)
*B23Q 11/00* (2006.01)
*B23Q 11/06* (2006.01)
*B27G 19/02* (2006.01)
*F16P 3/12* (2006.01)

(52) U.S. Cl.
CPC ........ *B23Q 11/0089* (2013.01); *B23Q 11/0082* (2013.01); *B23Q 11/06* (2013.01); *B27G 19/02* (2013.01); *F16P 3/12* (2013.01); *Y10S 83/01* (2013.01)
USPC ... 83/62; 83/63; 83/76.1; 83/76.8; 83/DIG. 1; 83/477.2

(58) Field of Classification Search
USPC ............... 83/477.2, 76.7, 397–397.1, 58, 62, 83/DIG. 1, 544, 546, 860, 447, 478, 366, 83/368, 369, 370, 63, 76.8; 74/612
See application file for complete search history.

(56) References Cited

U.S. PATENT DOCUMENTS

| 1,511,797 | A * | 10/1924 | Berghold | 83/860 |
|---|---|---|---|---|
| 2,913,926 | A * | 11/1959 | Hammond | 74/612 |
| 3,880,032 | A * | 4/1975 | Green | 83/102.1 |
| 3,888,148 | A * | 6/1975 | Weissman | 83/100 |
| 4,033,218 | A * | 7/1977 | Donatelle | 83/478 |
| 4,532,501 | A * | 7/1985 | Hoffman | 340/679 |
| 5,181,447 | A * | 1/1993 | Hewitt | 83/447 |
| 5,212,621 | A * | 5/1993 | Panter | 361/181 |
| 5,918,522 | A * | 7/1999 | Benedict et al. | 83/478 |
| 6,418,829 | B1 * | 7/2002 | Pilchowski | 83/397 |
| 7,173,537 | B2 * | 2/2007 | Voigtlaender | 340/585 |
| 7,373,863 | B2 * | 5/2008 | O'Banion et al. | 83/63 |
| 7,975,585 | B1 * | 7/2011 | Shiban | 83/440.2 |
| 8,079,295 | B2 * | 12/2011 | Gass | 83/478 |
| 8,091,456 | B2 * | 1/2012 | Keller et al. | 83/477.2 |
| 8,122,798 | B1 * | 2/2012 | Shafer et al. | 83/62.1 |
| 2002/0170399 | A1 * | 11/2002 | Gass et al. | 83/62.1 |
| 2004/0200329 | A1 * | 10/2004 | Sako | 83/58 |
| 2004/0226424 | A1 * | 11/2004 | O'Banion et al. | 83/397 |
| 2009/0301275 | A1 * | 12/2009 | Jung et al. | 83/58 |
| 2010/0037739 | A1 * | 2/2010 | Anderson et al. | 83/58 |
| 2010/0257990 | A1 * | 10/2010 | Schell et al. | 83/397 |
| 2011/0113939 | A1 * | 5/2011 | Simon | 83/13 |

FOREIGN PATENT DOCUMENTS

| DE | 48999 | * | 2/1889 | ............ B27G 19/02 |
|---|---|---|---|---|
| FR | 2561570 | * | 9/1985 | ............ B23Q 11/08 |

* cited by examiner

*Primary Examiner* — Laura M Lee

(74) *Attorney, Agent, or Firm* — Maginot, Moore & Beck

(57) ABSTRACT

The invention is based on a power tool, in particular a stationary saw, having a guard device which has a guard element. It is proposed that the guard device has an actuator system, which is provided for monitoring an opening which is formed at least by the guard element and is adaptable to at least one geometric feature of a workpiece.

15 Claims, 2 Drawing Sheets

POWER TOOL

CROSS-REFERENCE TO RELATED APPLICATION

This application is based on German Patent Application 10 2008 054 696.8 filed Dec. 16, 2008.

BACKGROUND OF THE INVENTION

1. Field of the Invention

The invention is based on a power tool, in particular a stationary saw, having a guard device which has a guard element.

2. Description of the Prior Art

A power tool, in particular a stationary saw, with a guard device that has a guard element is already known.

SUMMARY OF THE INVENTION

It is proposed that the guard device has an actuator system, which is provided for monitoring an opening which is formed at least by the guard element and is adaptable to at least one geometric feature of a workpiece. In particular, the size of the opening is adaptable. The term "opening formed by the guard element" should be understood in particular to mean a region which is bounded by the guard element and a further element, such as a work face, on at least two sides and preferably four sides. The term "provided" should in particular be understood to mean especially equipped, designed, and/or programmed. The term "monitored" should be understood in particular to mean that the guard device can prevent a change and in particular an increase in size of the opening. Advantageously, the guard device can force a reduction in size of the opening in at least one operating state. By the embodiment according to the invention of the power tool, a power tool with an inexpensive, reversible and structurally simple guard device can be attained.

It is furthermore proposed that the guard device has a sensor device, which is provided for distinguishing at least the workpiece from a body part of a user. Advantageously, the sensor device is embodied as a UV/VIS/NIR sensor device. Alternatively, it may be embodied as a UWB, or capacitive or some other sensor device that appears useful to one skilled in the art. By means of the guard device, an approach of the body part to a tool of the power tool can advantageously be detected and thus prevented.

In a further feature, it is proposed that the guard device has a sensor device, which in at least one operating state ascertains a geometric feature of at least a part of the workpiece. Advantageously, the sensor device is embodied as an ultrasonic sensor device. Alternatively, it may be embodied as a tactile, optical, or other kind of sensor device that appears useful to one skilled in the art. The phrase "a geometric feature of at least a part of the workpiece" should be understood in particular to mean a height of the workpiece and/or at least one other external dimension of the workpiece that appears useful to one skilled in the art. The term "operating state" should be understood for instance to mean a state that is characterized by machining of a workpiece. By the ascertainment of the geometric feature of the workpiece, the guard device can advantageously position the guard element in such a way that machining of the workpiece is possible without restriction.

It is furthermore proposed that the sensor device is disposed at least partly in a front region of the guard element. The term "front region" should be understood in particular to mean a region in the direction of which machining of the workpiece advances, viewed from the tool of the power tool. As a result of this disposition of the sensor device, a danger range can effectively be monitored.

It is furthermore proposed that the sensor device has a tactile sensor. Advantageously, the tactile sensor can ascertain at least one datum which distinguishes a body part of a user from a workpiece and/or contains at least one geometric feature of a workpiece. A tactile sensor is especially inexpensive, is reliable, and can advantageously be adapted to the guard device.

In a further feature, it is proposed that the guard device has a control unit, which in at least one operating state moves the guard element by means of the actuator system on the basis of the geometric feature of the workpiece. In particular, the guard element can be moved by the actuator system about an axis of rotation of the actuator system and/or linearly. The phrase "by means of the actuator system" should be understood in particular to mean that the control unit triggers the actuator system, and the actuator system moves the guard element. By means of the motion of the guard element along the geometric feature of the workpiece, an especially effective and safe guard device can be furnished.

It is furthermore proposed that the actuator system has at least one actuator, which in at least one operating state moves the guard element to between a body part of a user and a tool. The phrase "move to between a body part of a user and a tool" should be understood in particular to mean that the guard element is put by the actuator into a position in which the guard element is located on a line between the tool and the body part. By means of the guard element that is located between the user and the tool, the user is especially effectively protected and can recognize a dangerous situation especially well.

It is furthermore proposed that the actuator system has a locking element, which is provided for preventing a change in a size of the opening. The phrase "prevent a change in a size of the opening" should be understood in particular to mean that the locking element prevents a motion of the guard element that would cause an increase in size of the opening. By means of the locking element, a fixation of the guard device can be attained structurally simply, making the guard device especially simple and economical.

It is moreover proposed that the guard element has an introduction chamfer, which is provided for converting a motion of the workpiece into a motion of the guard element. The term "to convert" should be understood in this connection in particular to mean that the introduction chamfer transmits a force, exerted on the workpiece by a user, to the guard element and in so doing changes a direction of the force. Because of the introduction chamfer, a motor driving the guard element can advantageously be dispensed with.

In a further feature, it is proposed that the guard element has a plurality of segments, which are movable independently of one another, as a result of which the size of the opening can be adapted especially flexibly to a geometric feature of the tool.

It is furthermore proposed that the segments are pivotable in a main working direction. The phrase "pivotable in a main working direction" should be understood in this connection in particular to mean that the segments are movable about pivot axes that are perpendicular to a direction of motion of the workpiece relative to the tool. The term "main working direction" should be understood in particular to mean a direction in which the workpiece is moved relative to the tool in a machining operation. By means of the pivotable segments, a structurally simple guard device can be attained.

It is furthermore proposed that the segments are disposed offset from one another. The phrase "offset from one another" should be understood in particular to mean that the segments, along their pivot axes which are preferably parallel to one another, are disposed at different distances from the tool. Because of the offset disposition of the segments, the segments are movable independently of one another.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
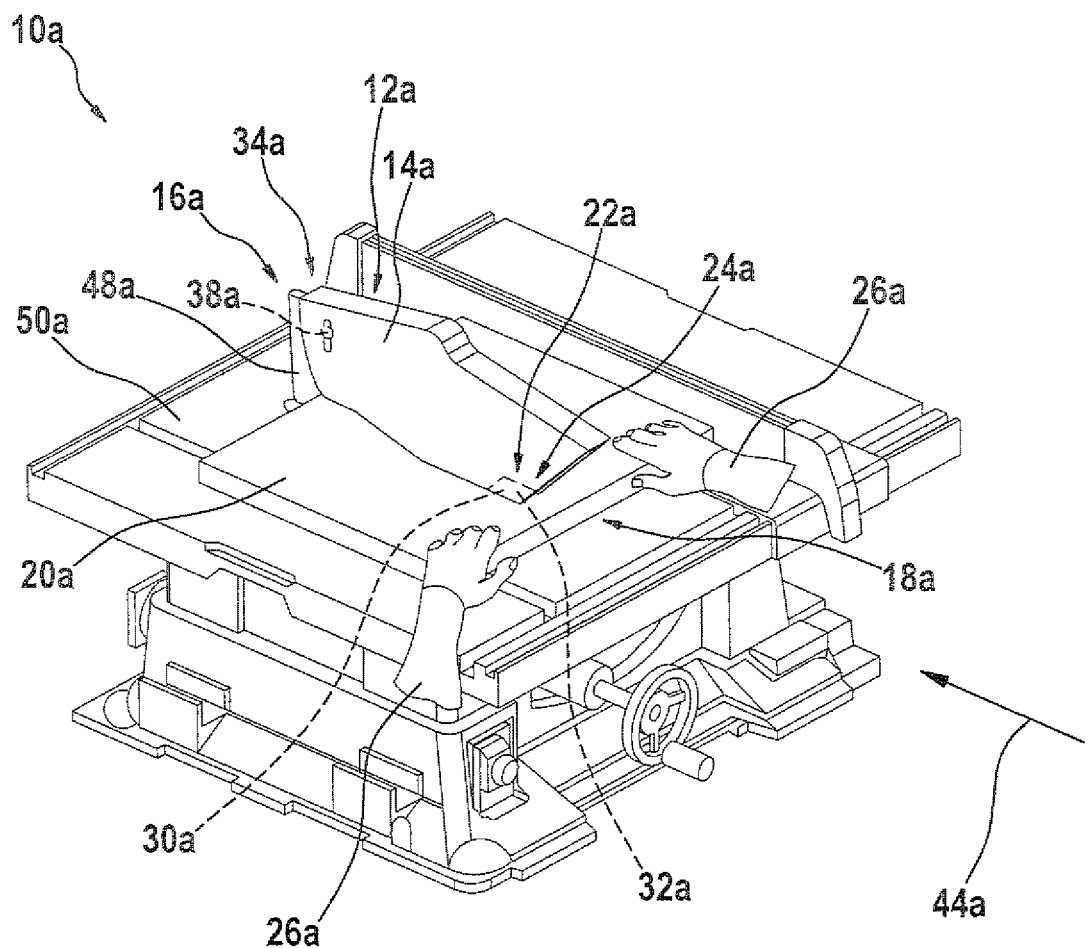
FIG. 1 shows a power tool with a guard device of the invention in a perspective view.
Figure 2:
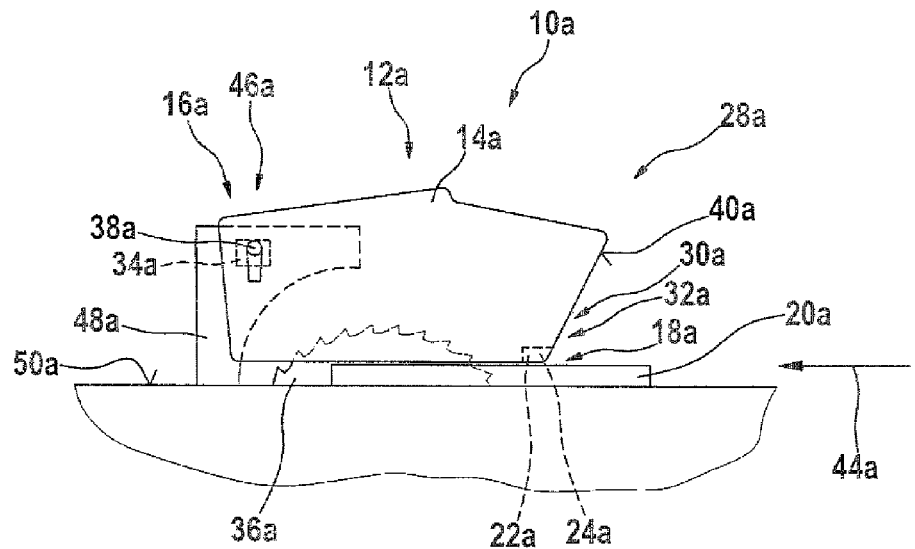
FIG. 2 shows the power tool of FIG. 1 in a side view from the left.

In FIGS. 1 and 2, a power tool 10a, embodied as a circular saw, with a guard device 12a is shown. The guard device 12a has a guard element 14a, which is embodied as a guard hood shaped like a U profile as viewed from the front in section. The guard element 14a extends parallel to a main working direction 44a of the power tool 10a above a tool 36a, that is, on a side of the tool remote from a work face 50a of the power tool 10a, and partially surrounds the tool 36a. In a region 46a that is to the rear in the main working direction 44a, the guard element 14a is connected to a remainder of the power tool 10a by means of a dividing wedge 48a, which the guard element 14a straddles such that the side walls of the U profile are divided. In a front region 28a, the guard element 14a is embodied in closed fashion between the two legs of the guard hood that is in the shape of a U profile. Alternatively, the guard element 14a may also have a sufficiently great excess length compared to the tool 36a in the front region 28a.

The guard device 12a has an actuator system 16a, which monitors an opening 18a that is formed by the guard element 14a and is adaptable to a height of a workpiece 20a. For this monitoring purpose, the guard device 12a has a control unit 32a, embodied as an arithmetic unit, which before, during and after a machining operation of the workpiece 20a can move the guard element 14a on the basis of a geometric feature, in this case the height of the workpiece 20a, by means of the actuator system 16a. The actuator system 16a is disposed in the rear region 46a of the guard element 14a and connects the guard element 14a movably to the dividing wedge 48a and thus movably relative to the work face 50a. The actuator system 16a has an actuator 34a, embodied as a motor, which moves the guard element 14a in a region perpendicular to the main working direction 44a and perpendicular to the work face 50a. In addition, the guard element 14a has an introduction chamfer 40a, which, if a user presses the workpiece 20a against the guard element 14a, converts a motion of the workpiece 20a into a motion of the guard element 14a. As a result, the guard element 14a is moved in the direction perpendicular to the main working direction 44a and perpendicular to the work face 50a.

At the place where the user can press the workpiece 20a against the guard element 14a, that is, in the front region 28a of the guard element 14a, the guard device 12a has a first sensor device 22a. By means of the sensor device 22a, the control unit 32a can distinguish in contactless fashion whether the user is pushing the workpiece 20a or a body part 26a onto the guard element 14a. Only when the sensor device 22a detects a workpiece 20a in the front region 28a, in which machining of the workpiece 20a is advancing, does the control unit 32a enable a motion of the guard element 14a, or in other words the control unit 32a reinforces or accomplishes the motion by means of the actuator 34a of the actuator system 16a. The guard device 12a has a second sensor device 24a, with a tactile sensor 30a, which is embodied partly integrally with the first sensor device 22a. By means of the second sensor device 24a, the control unit 32a ascertains a geometric feature, in this case a height of the workpiece 20a. On the basis of the geometric feature ascertained, the control unit 32a adjusts the size of the opening 18a. The control unit 32a is embodied partly integrally with the two sensor devices 22a, 24a.

Once the user has activated the power tool 10a, he pushes the workpiece 20a, in this case a plank of wood, toward the guard element 14a in the main working direction 44a. By means of the first sensor device 22a, which is embodied as a UV/VIS/NIR sensor, the control unit 32a recognizes that the workpiece 20a is not a body part 26a of the user. As soon as the second sensor device 24a detects the height of the workpiece 20a, the actuator system 16a moves the guard element 14a upward and thus increases the size of the opening 18a between the guard element 14a and the work face 50a, so that the workpiece 20a can be thrust between the guard element 14a and the work face 50a toward the tool 36a. If the user places a body part 26a on the workpiece 20a and pushes it along with the workpiece 20a in the direction of the tool 36a, then this is detected by the control unit 32a by means of the first sensor device 22a. The actuator system 16a has a locking element 38a, which in this case prevents a change in a size of the opening 18a.

If the control unit 32a, by means of the sensor devices 22a, 24a, recognizes that a user is pushing either a body part 26a following the workpiece 20a, or a body part 26a itself, underneath the guard element 14a, then various protective mechanisms are possible. The user can be warned by means of an optical or acoustical signal from a signaling device, not shown. The control unit 32a brakes the tool 36a and stops it. The actuator system 16a, by moving the guard element 14a, prevents any further motion of the body part 26a of the user toward the tool 36a, in that the actuator system 16a moves at least the guard element 14a to between the body part 26a of the user and the tool 36a.

Figure 3:
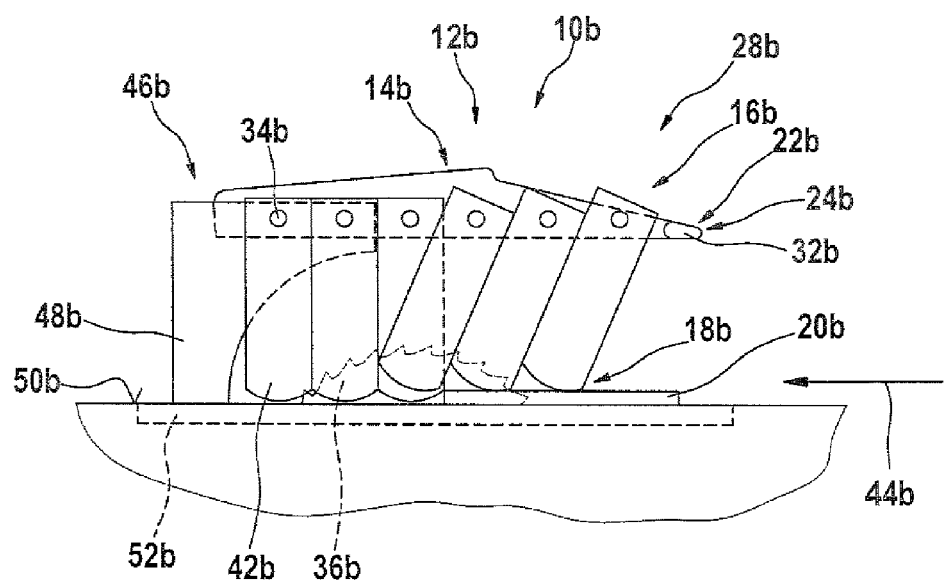
FIG. 3 shows an alternative power tool, with a guard element divided up into segments, in a side view.

In FIG. 3, a further exemplary embodiment of the invention is shown. For distinguishing between the exemplary embodiments, the letter a in the reference numerals of the exemplary embodiment in FIGS. 1 and 2 is replaced by the letter b in the reference numerals of the exemplary embodiment in FIG. 3. The ensuing description will be limited essentially to the differences from the exemplary embodiment in FIGS. 1 and 2; for components, characteristics and functions that remain the same, reference may be made to the description of the exemplary embodiment in FIGS. 1 and 2.

In FIG. 3, a guard device 12b of a power tool 10b is shown, with a guard element 14b which has a plurality of segments 42b, which are movable independently of one another and are pivotable in a main working direction 44b. The segments 42b are offset from one another along their pivot axes by a thickness of the segments 42b and are disposed one after the other in the main working direction 44b, so that they are pivotable counter to one another. Along the main working direction 44b, the guard element 14b has one row of segments 42b on each of the two sides of a tool 36b. By means of two contactless sensor devices 22b, 24b, which are disposed in a front region 28b of the guard element 14b, a control unit 32b ascertains a height of a workpiece 20b and distinguishes the workpiece 20b from a body part 26b, not shown in further detail here, of a user. If the control unit 32b, by means of the sensor devices 22b, 24b, recognizes that a user is pushing either a body part 26b following the workpiece 20b, or a body part 26b itself, underneath the guard element 14b, then various protective mechanisms are possible. The user can be warned by means of an optical or acoustical signal from a signaling device, not shown. The control unit 32b brakes the tool 36b and stops it. By moving the guard element 14a, an actuator system 16b, which for each segment 42b has one actuator 34b, prevents any further motion of the body part 26b of the user toward the tool 36b, in that the actuator system 16a moves at least one segment 42b to between the body part 26b of the user and the tool 36b. A further sensor device 52b of the power tool 10b detects how far the workpiece 20b has been thrust into an opening 18b and thus makes control of the individual segments 42b possible.

The foregoing relates to preferred exemplary embodiments of the invention, it being understood that other variants and embodiments thereof are possible within the spirit and scope of the invention, the latter being defined by the appended claims.

I claim:

1. A power tool comprising:
a guard device including a guard element, an actuator system, a sensor system, and a control unit,
wherein the actuator system is configured to move the guard element to define an opening,
wherein the sensor system is configured to (i) detect at least one geometric feature of a workpiece, and (ii) detect whether a body part of a user is proximate to the opening and whether the workpiece is proximate to the opening,
wherein the control unit is configured to operate the actuator system to move the guard element to (i) minimize a size of the opening when the sensor system detects the body part proximate to the opening, and (ii) adjust the size of the opening based on the at least one geometric feature of the workpiece detected by the sensor system when the sensor system does not detect the body part proximate to the opening, and
wherein the guard element has a plurality of segments, each of which is connected to a respective actuator of the actuator system, and the respective actuators are configured to move each segment in the plurality of segments independently of one another.

2. The power tool as defined by claim 1, wherein the sensor system includes:
a first sensor device configured to detect the at least one geometric feature of the workpiece, and
a second sensor device configured to detect whether the body part of the user is proximate to the opening and whether the workpiece is proximate to the opening.

3. The power tool as defined by claim 2, wherein the second sensor device is disposed at least partly in a front region of the guard element.

4. The power tool as defined by claim 2, wherein each of the first and second sensor devices is disposed at least partly in a front region of the guard element.

5. The power tool as defined by claim 2, wherein the first sensor device includes a tactile sensor.

6. The power tool as defined by claim 1, wherein the control unit actuates a signaling device or brakes a tool of the power tool when the control unit by means of the sensor system recognizes that the body part of the user is being pushed underneath the guard element.

7. The power tool as defined by claim 2, wherein the control unit is embodied partly integrally with the sensor devices.

8. The power tool as defined by claim 1, wherein:
the sensor system is supported on the guard element, and
movement of the guard element causes movement of the sensor system.

9. The power tool as defined by claim 1, wherein the actuator system includes a locking element configured to prevent a change in the size of the opening.

10. The power tool as defined by claim 9, wherein the control unit is further configured to activate the locking element to prevent the plurality of segments of the guard element from moving after operating the respective actuators to minimize the size of the opening when the sensor system detects the body part proximate to the opening.

11. The power tool as defined by claim 1, wherein the segments are pivotable in a main working direction.

12. The power tool as defined by claim 1, wherein the segments are disposed offset from one another.

13. The power tool as defined by claim 1, wherein each of the respective actuators is embodied as a motor.

14. The power tool as defined by claim 1, wherein the control unit is configured to operate the actuator system to move the plurality of segments of the guard element based on a height of the workpiece.

15. The power tool as defined by claim 2, wherein the control unit enables movement of the guard element by means of the actuator system only when the second sensor device detects the workpiece advancing in a front region of the guard element.

* * * * *